US010586067B2

(12) United States Patent
Chen et al.

(10) Patent No.: US 10,586,067 B2
(45) Date of Patent: Mar. 10, 2020

(54) SYSTEM AND METHOD OF PROTECTING DIGITALLY TRANSFERRED DATA

(71) Applicant: INTERNATIONAL BUSINESS MACHINES CORPORATION, Armonk, NY (US)

(72) Inventors: Yao Chen, Beijing (CN); De Shou Kong, Beijing (CN); Xin Xu, Beijing (CN); Jie Zheng, Beijing (CN); Hai Bo Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/438,990

(22) Filed: Feb. 22, 2017

(65) Prior Publication Data

US 2018/0239914 A1   Aug. 23, 2018

(51) Int. Cl.
*G06F 21/62* (2013.01)
*H04L 29/06* (2006.01)

(52) U.S. Cl.
CPC ...... *G06F 21/6227* (2013.01); *G06F 21/6245* (2013.01); *H04L 63/0428* (2013.01); *H04L 63/083* (2013.01)

(58) Field of Classification Search
CPC ............... G06F 21/608; G06F 21/6227; H04L 63/0861; H04L 63/0428; H04L 63/083
See application file for complete search history.

(56) References Cited

U.S. PATENT DOCUMENTS

| | | | | |
|---|---|---|---|---|
| 5,889,860 A | * | 3/1999 | Eller | G06F 21/10 705/51 |
| 6,598,161 B1 | * | 7/2003 | Kluttz | G06F 21/6209 713/166 |
| 6,602,298 B1 | * | 8/2003 | Kirshenbaum | G06F 21/608 382/306 |
| 6,839,844 B1 | * | 1/2005 | Okano | G09C 5/00 380/246 |
| 7,010,681 B1 | * | 3/2006 | Fletcher | H04L 63/0428 713/154 |
| 7,557,806 B2 | | 7/2009 | Ng | |
| 8,776,249 B1 | * | 7/2014 | Margolin | G06F 21/606 380/277 |
| 9,235,711 B1 | | 1/2016 | Xavier | |
| 9,727,748 B1 | * | 8/2017 | Yaeger | G06F 21/6218 |
| 10,169,599 B2 | * | 1/2019 | Fox | G06F 21/6218 |

(Continued)

OTHER PUBLICATIONS

Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <.

(Continued)

*Primary Examiner* — Michael Pyzocha
(74) *Attorney, Agent, or Firm* — Schmeiser, Olsen & Watts, LLP; Mark Vallone

(57) ABSTRACT

The present invention provides a method and system for receiving by a user from a source a communication being a fragment of a message having an unrecognizable part containing confidential data. The unrecognizable part is converted into recognizable data upon receipt of the communication and presented to the user. The user can send a request for an additional fragment of the message if needed to complete the message or to decipher the message.

14 Claims, 6 Drawing Sheets

(56) References Cited

U.S. PATENT DOCUMENTS

| | | | | |
|---|---|---|---|---|
| 2003/0231767 | A1* | 12/2003 | Carbajal | H04L 63/0428 380/200 |
| 2004/0022391 | A1* | 2/2004 | O'Brien | H04L 9/0822 380/281 |
| 2006/0075228 | A1* | 4/2006 | Black | H04L 63/0428 713/167 |
| 2007/0002390 | A1* | 1/2007 | Nakabayashi | H04N 1/32128 358/401 |
| 2008/0317246 | A1* | 12/2008 | Manders | H04N 5/783 380/37 |
| 2009/0161870 | A1* | 6/2009 | Rosenberg | G06F 21/6218 380/268 |
| 2009/0199302 | A1* | 8/2009 | So | G06F 21/6218 726/27 |
| 2009/0323087 | A1* | 12/2009 | Luo | G06F 17/2288 358/1.9 |
| 2010/0042828 | A1* | 2/2010 | Masui | G09C 5/00 713/153 |
| 2011/0119361 | A1* | 5/2011 | Issa | G06Q 30/02 709/223 |
| 2011/0247081 | A1* | 10/2011 | Shelton | G06F 21/6218 726/28 |
| 2012/0028659 | A1* | 2/2012 | Whitney | H04M 1/72547 455/466 |
| 2012/0207306 | A1* | 8/2012 | Candelore | H04L 67/06 380/287 |
| 2013/0117802 | A1* | 5/2013 | Fendt | G06F 21/6218 726/1 |
| 2014/0208418 | A1* | 7/2014 | Libin | G06F 21/6209 726/19 |
| 2015/0033008 | A1* | 1/2015 | Einarsson | H04L 63/0428 713/150 |
| 2015/0149762 | A1* | 5/2015 | Crolley | H04L 63/0428 713/150 |
| 2015/0169886 | A1* | 6/2015 | Bhagwan | G06F 21/6254 726/26 |
| 2016/0063264 | A1* | 3/2016 | Baek | G06F 16/164 713/165 |
| 2016/0070812 | A1* | 3/2016 | Murphy | G06F 17/212 707/608 |
| 2016/0164854 | A1 | 6/2016 | Lerman et al. | |
| 2016/0378999 | A1* | 12/2016 | Panchapakesan | G06F 21/6254 726/26 |
| 2017/0061138 | A1* | 3/2017 | Lambert | H04L 63/18 |
| 2017/0104723 | A1* | 4/2017 | Merritt | H04L 63/0281 |
| 2017/0220813 | A1* | 8/2017 | Mullins | G06F 21/6218 |

OTHER PUBLICATIONS

"Password", retrieved on Sep. 20, 2019 from the Internet: <URL: https://en.wikipedia.org/wiki/Password>, p. 1.

"About encryption keys", retrieved on Sep. 20, 2019 from the Internet: <URL: https://www.ibm.com/support/knowledgecenter/en/STPRH6/com.ibm.storage.drives.doc/top_tscom_reuse_encryptoview_keys.html>, p. 1.

* cited by examiner

SYSTEM AND METHOD OF PROTECTING DIGITALLY TRANSFERRED DATA

TECHNICAL FIELD

The invention relates generally to the field of protecting digitally transferred data, and in particular to a method and system for shielding confidential information from unintended recipients.

BACKGROUND

When accessing an intranet or virtual private network VPN via the internet in a public setting outside of the intranet access area, confidential information can be compromised. For instance, business traveler's can snoop onto their neighbor's computing device. Accordingly, there is a need for a protective method to transfer confidential data so that a recipient can access the confidential data without information leakage to others.

SUMMARY

The present invention provides a method, and associated computer system and computer program product, for: receiving by a user from a source a communication being a fragment of a message having an unrecognizable part containing confidential data; converting the unrecognizable part of the fragment into recognizable data upon receipt of the communication; presenting to the user the fragment of the message including the recognizable data; and sending by the user a request for an additional fragment of the message if the additional fragment is needed to decipher the message.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

Figure 1:
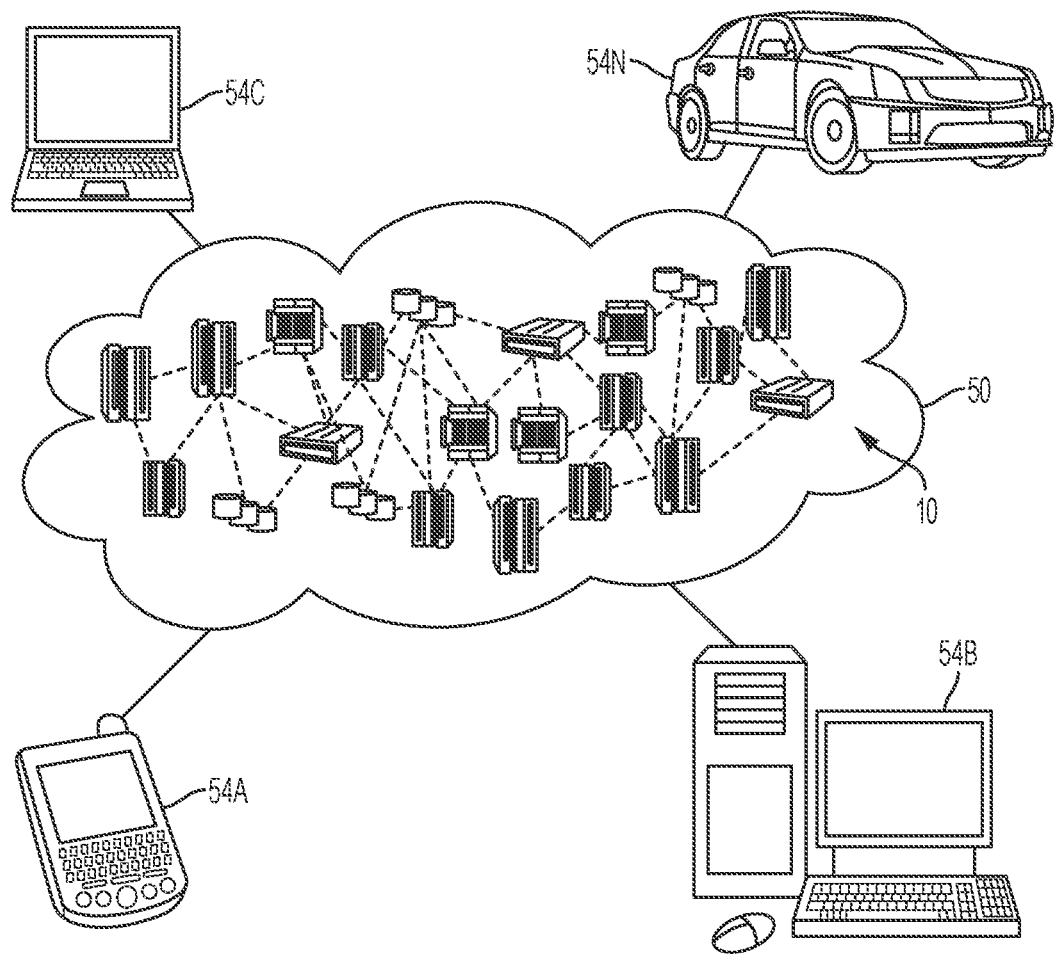
FIG. 1 depicts a cloud computing environment according to an embodiment of the present invention.

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
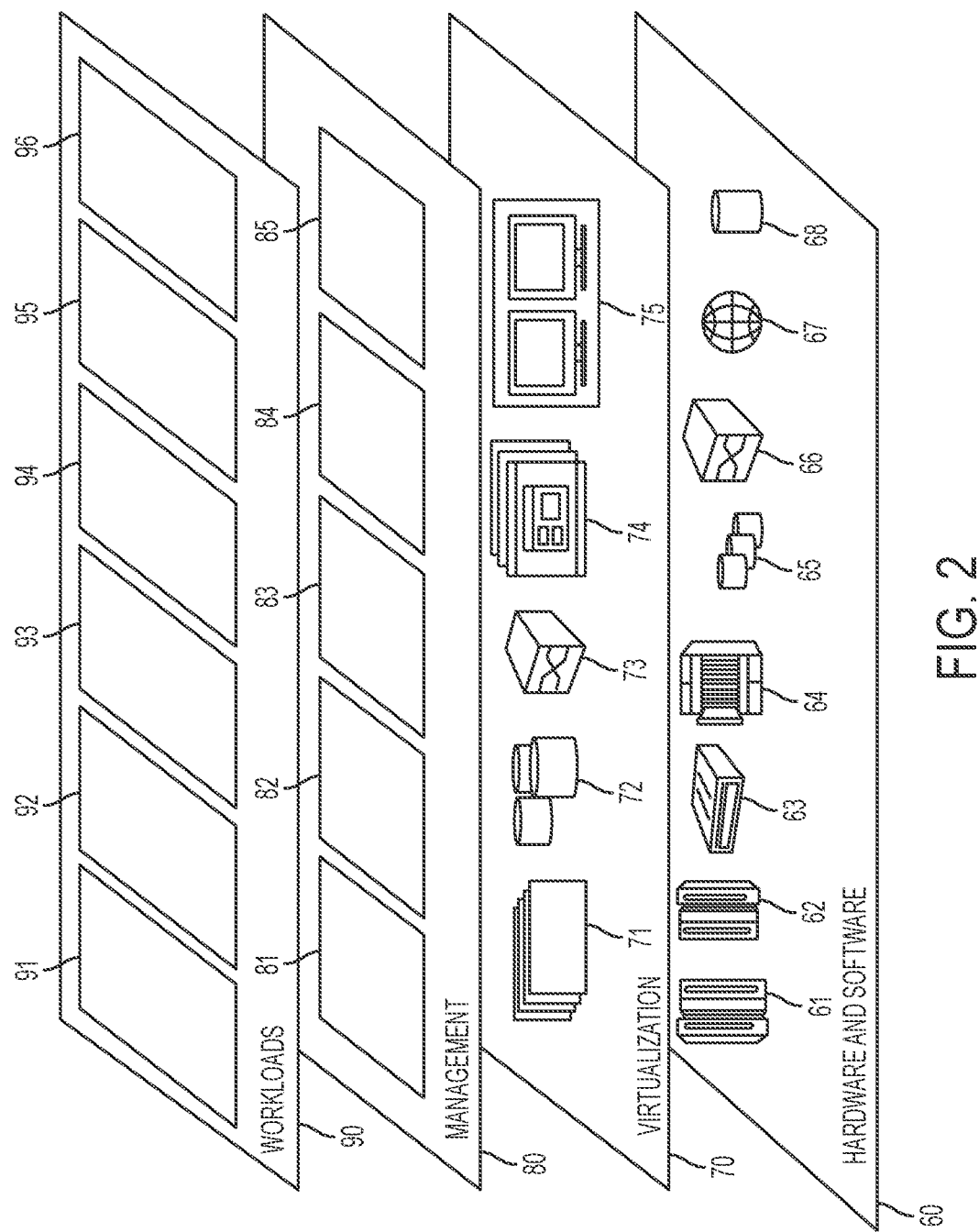
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure transfer 96 for protecting and encrypting data transferred from a source to a specific recipient.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
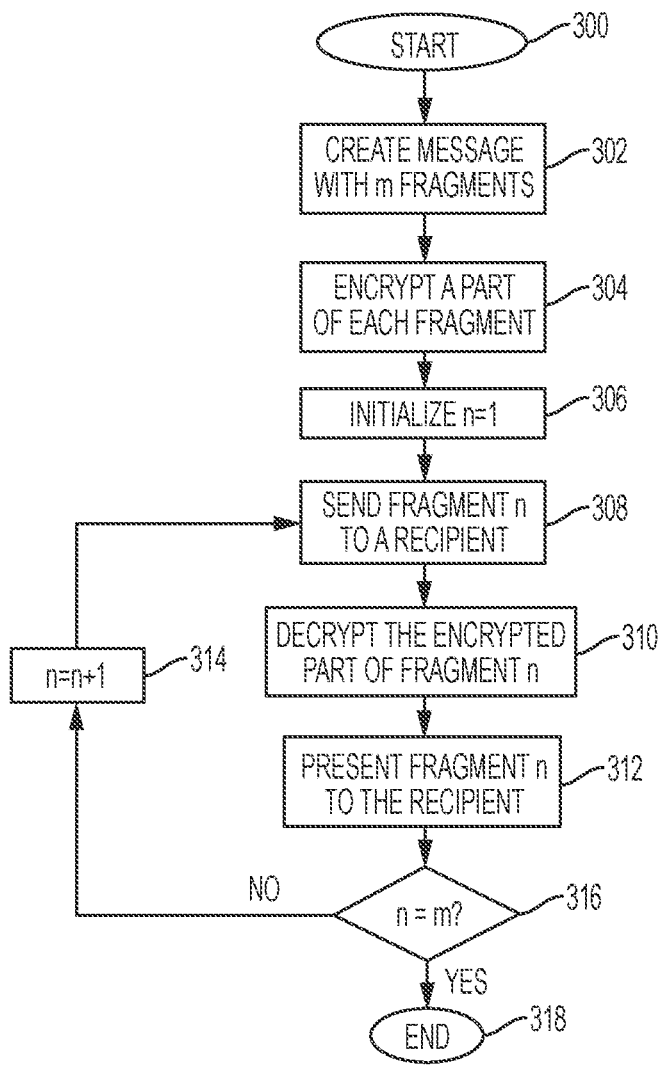
FIG. 3 is a flow chart diagram of a method in accordance with a first embodiment of the present invention.

FIG. 3 is a flow chart diagram of a method in accordance with a first embodiment of the present invention. The method starts in step 300 and in step 302 when a sender/source creates a message which is divided into an integer m number of fragments. The sender/source can be identified as a computing device such as, but not limited to, computer, server, smart phone, computer tablet, laptop, etc. and the sender/source can also be considered or identified as a person sending a message to a recipient.

Each fragment will include one or more sections which contain data which is confidential or otherwise sensitive and not meant to be widely distributed. It may be intended for the confidential data to be presented only to a given person or persons. For example, confidential financial data related to an individual can be communicated in the message whereby sensitive financial or personal information can be encrypted so that only an intended recipient will be able to access the data.

Figure 5:
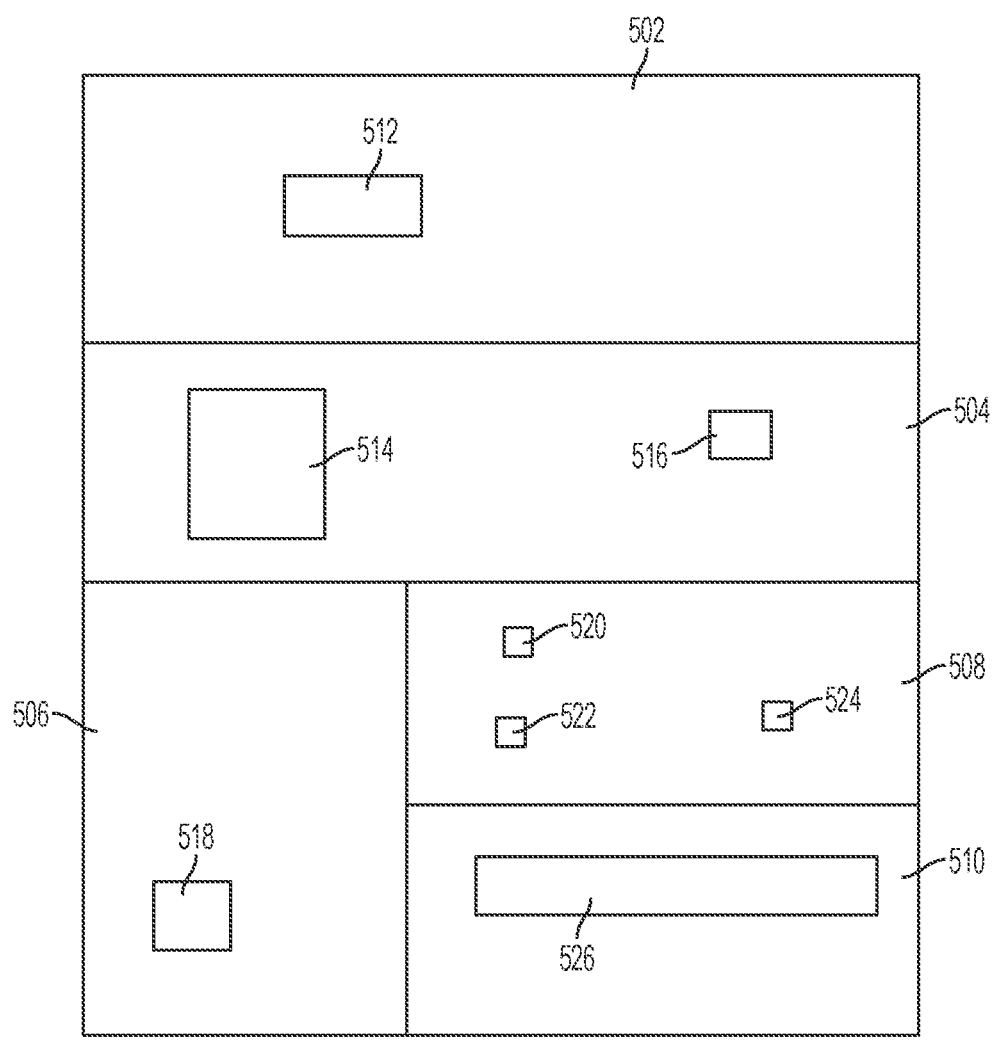
FIG. 5 is a diagrammatic representation of a message having fragments in accordance with an embodiment of the present invention.

FIG. 5 is a diagrammatic representation of a message 500 having fragments in accordance with an embodiment of the present invention. The message 500 is created in step 302 of FIG. 3 by the sender/source and in this case the message contains 5 fragments, i.e. m=5, identified as fragments 502, 504, 506, 508 and 510. Each fragment has one or more parts of the respective fragment which will be encrypted in step 304 to render the part of the fragment as unrecognizable without decryption. The message 500 as a whole and each of its various fragments 502, 504, 506, 508, 510 can be represented in any known manner such as by diagrams, text, letters, numbers, symbols, drawings or photographs.

In FIG. 5, fragment 502 includes a section or part 512 which is encoded after creation by the sender. The encoding can be accomplished by any known encoding or encryption technique so long as the part 512 becomes unrecognizable by anyone viewing the fragment 502. Similarly, message fragment 504 includes two encoded/unrecognizable parts 514, 516; fragment 506 includes an encoded/unrecognizable part 518; fragment 508 includes three encoded/unrecognizable parts 520, 522, 524; and fragment 510 includes an encoded/unrecognizable part 526.

The method of FIG. 3 continues in step 306 by initializing the first fragment 502 corresponding to n=1 whereby the complete message 500 includes fragments ranging from n to m. In this particular example m=5, so there are 5 message fragments 502, 504, 506, 508 and 510. In step 308, n=1 so fragment 502 of message 500 is sent via wireless communication from a computing device of the sender/source to a computing device of a user who is an intended recipient of the message. The computing devices of the sender and the receiver can be any type of devices which are capable of transmitting and/or receiving a wireless communication, for instance, a smart phone, computer, mobile phone, portable computer, tablet, laptop, etc. The communications devices could alternately be hardwired into a network, and the communications network could be for instance the internet, an intranet, a private or public cloud, a proprietary network, a virtual private network VPN, a local area network LAN, etc.

In this particular example, the message 500 is sent from a bank representative Ms. Aldridge on her desktop work computer at the bank to a bank customer, Mr. Jones who receives the message on his smart phone having wireless networking capabilities. Some of the information of the message is confidential and is only meant to be seen by Mr. Jones. The method of the invention prevents others from seeing or otherwise accessing the confidential data of the unrecognizable part of a message fragment, even if the remainder of the message fragment is readable by others.

As shown in FIG. 5 fragment 502 contains a segment or part 512 which is a bank account number for Mr. Jones. Fragment 504 contains a special photograph or image 514 and a code number 516 which are both used in accessing Mr. Jones's bank account. Fragment 506 contains a part 518 which is a fingerprint image of Mr. Jones's right index finger. Fragment 508 includes segments 520, 522, 524 which contain personal information such as Mr. Jones's social security number, address and phone number. Finally, fragment 510 includes a segment 526 which is a monetary balance of Mr. Jones's bank account.

Continuing with the method of FIG. 3, Mr. Jones receives a first fragment 502 in step 308. When Mr. Jones receives the fragment 502, section 512 is unrecognizable, unreadable and represented as a blurred part/section of the fragment 502 on the display screen of Mr. Jones's smart phone. Thus, even if another person saw the message fragment 502, e.g. on Mr. Jones's phone, or other computing device, the section 512 would be encoded and unrecognizable. Mr Jones could access and decode the information from unrecognizable part 512 for instance by passing the cursor of his smart phone over the unrecognizable area 512 in step 310 to initiate a pop up. The pop up could present a legible version of the unrecognizable area 512, or it could require additional user interaction, such as prompting a selection to decode the encrypted data. Also, selection of the unrecognizable part 512 could occur via a touch screen or other known means for selecting a portion of a display.

Any known encoding/decoding technique or software could be employed to encode the part 512 from the sender/source, and then to allow decoding of the part 512 by the receiver. For instance, the part 512 could be obscured by using an unrecognizable font set, or by filling the background area of the part 512 with a color to obscure it.

The information of part 512 could be communicated via an audio file whereby for example Mr. Jones would pass his cursor over part 512, select an audio device to play from the pop up, and then play the audio file. The audio file could play from a speaker on Mr. Jones's cell phone, or more privately could be sent to a headphone jack of his smart phone so he could listen to the audio file without others hearing the information. In this example, in fragment 502 Mr. Jones could select to listen on his headphones to the unrecognized part 512 which is his bank account number.

After the unrecognized part 512 of fragment 502 has been decoded in step 310 and presented to the recipient in step 312, a determination is made in step 316 whether the complete message 500 has been received by determining whether n=m. At this point Mr. Jones has only received one message fragment 502 although n=1 and m=5, so the process will continue to step 314 whereby n is incremented by 1.

When n=2, fragment 504 is sent to, and received by, Mr. Jones who will decode the unrecognizable parts 514, 516 in the same manner as previously described for segment 512. In this case unrecognizable part 514 is a photograph or symbol which Mr. Jones has previously selected to confirm his identity with regards to his bank account. Unrecognizable part 516 is a three digit code that confirm's Mr. Jones's identity when communicating with the bank.

When n=3, then fragment 506 is sent to, and received by, Mr. Jones who will decode the unrecognizable part 518 in the same manner as previously described. When n=4, fragment 508 with unrecognizable parts 520, 522, 524 is sent to Mr. Jones, and when n=5 then fragment 510 with unrecognizable part 526 is communicated. When it is determined in step 316 that n=m, then the process will end in step 318.

Figure 4:
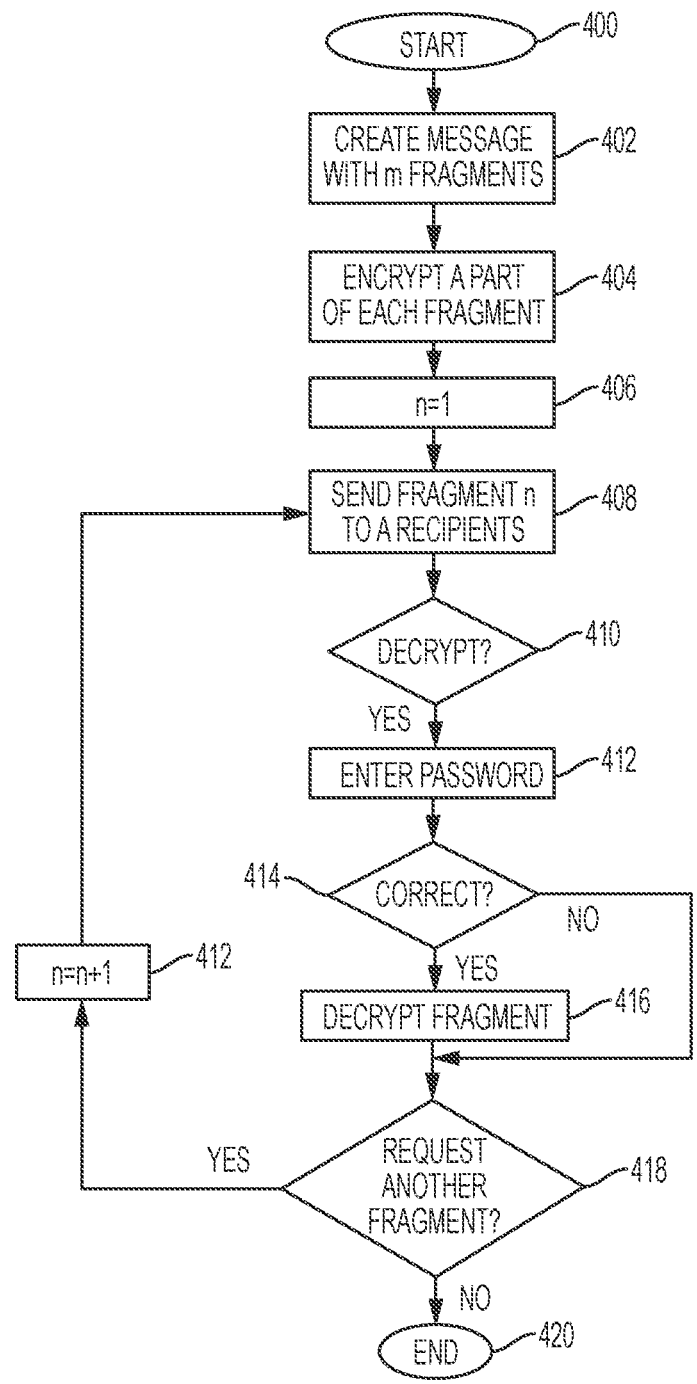
FIG. 4 is a flow chart diagram of a method in accordance with a second embodiment of the present invention.

FIG. 4 is a flow chart diagram of a method in accordance with a second embodiment of the present invention. In this case the method starts in step 400 and the message is created in step 402 by a sender/source as a spreadsheet document of m fragments of data pertaining generally to billable hours of firm members of an Accounting Firm for various projects. Some of the information which is communicated is applicable to all firm members and should be viewable by all firm members, while other information is applicable only to individual firm members and should only be viewable by each individual firm member, respectively. The sender will portion the spreadsheet into m fragments in step 402 whereby each fragment will contain some encrypted data of unrecognized parts in step 404. In certain embodiments of the invention, there may be both message fragments which include encrypted data, and message fragments without any encrypted data.

The first fragment to be communicated is initialized in step 406 corresponding to n=1 of m fragments. In step 408 fragment 1 (i.e. fragment n) is sent to, and received by, each of the firm members. Fragment 1 includes some sensitive information in a fragment part which is only meant to be seen by firm members Tom and Sophie. In step 410 both Tom and Sophie, upon receiving fragment 1 on their own private computing devices, will separately decide whether to decrypt the sensitive information of the fragment part which is unrecognizable by being encrypted, blurred, blacked out, or otherwise obscured from general view by anyone viewing the fragment part. If they choose to decode the fragment part in step 410, then they will be prompted for, and enter, a password in step 412. If one of the other firm members (or any other third party) tries to decrypt an unrecognizable part of a fragment, he/she will not be able to do so without the proper password. Each firm member will have his own individual password for accessing his own confidential information. If the password is verified as correct in 414, then the process continues in step 416 where the sensitive data is decrypted. If step 414 determines that an incorrect password was entered, then the process continues in step 418 without decrypting fragment 1.

In step 418 a request may be made for another fragment of the spreadsheet. For instance if Tom has received all the information that he needs, including his billable hours by receiving the fragment 1 (i.e. where n=1), then he may not decide to request another fragment of the message in step 418, and the process will thereafter end in step 420. However if Sophie needs additional information, then she might request another fragment of the message (i.e. the spreadsheet) in step 418. The fragment number will be incremented in step 412 to n=n+1 and the above-described process will continue by looping back to step 408. If firm member Joseph needs his billable hours which are contained in message fragment 8, then Joseph will likely continue to request additional fragments in step 418 for values of n=1 to 8, each time looping back to step 408 until he receives fragment 8. Further if the last fragment is detected in step 418 where n=m, then the process will terminate in step 420. In one embodiment, an additional fragment requested by the user in step 418, is included in the message of fragments created by the sender/source in step 402. The additional segment includes a password for converting the unrecognizable part of the fragments into recognizable data. The additional fragment is needed by the user, in step 412 of FIG. 4, to decipher the message.

In yet another embodiment, the source or sender can send one fragment after another at selected or random time intervals, such as sending a separate fragment of a five fragment message every hour until the recipient has received all 5 fragments after a 5 hour time period. Further, once the receiver gets the information that he wants or needs, he can reply to the sender to stop sending additional fragments. Typically each fragment of a message will contain certain key points of a composite message which are only useful in total. Thus even if an unintended recipient snoops or otherwise views confidential data of one fragment, comprehension of the complete message would not occur without having all fragments of the message. In this way the inventive method effectively dissects a message, encodes the various parts/fragments, sends each encoded part/fragment at a separate time and in a separate communication, and individually decodes each of the parts/fragments of each separate communication. This allows the recipient user to reassemble the various decoded parts/fragments of the message for an understanding of the complete message.

Figure 6:
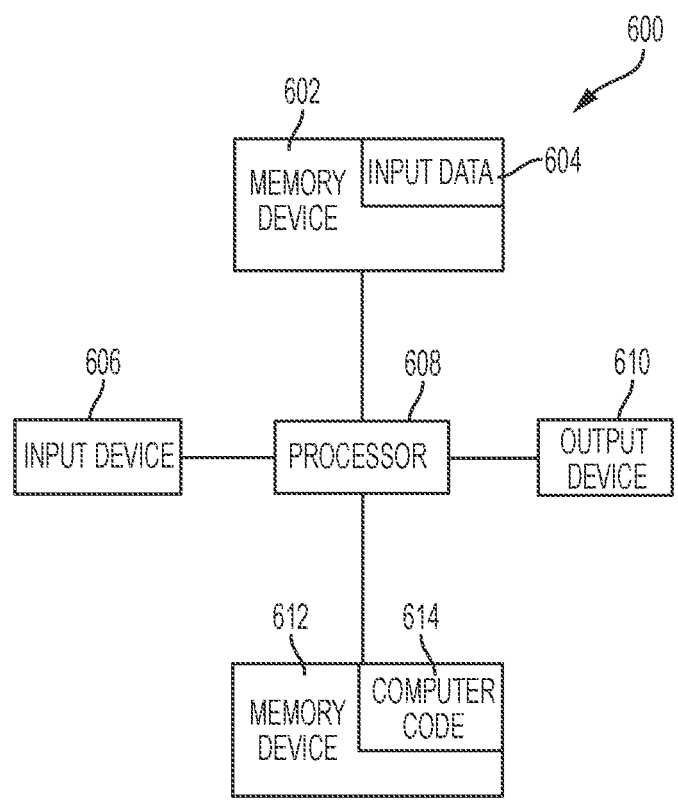
FIG. 6 illustrates a computer system for implementing the methods of the present invention.

FIG. 6 illustrates a computer system 600 for implementing the methods of the present invention. The computing system or device 600 could be any wireless computing device such as, but not limited to, a smart phone, a laptop or desktop computer, a computer tablet, etc. The computing system/device 600 includes a processor 608, an input device 604 coupled to the processor 608, an output device 610 coupled to the processor 608, and memory devices 602 and 612 each coupled to the processor 608. The input device 604 may be, inter alia, a keyboard, a mouse, etc. The output device 610 may be, inter alia, a printer, a plotter, a computer screen, a magnetic tape, a removable hard disk, a floppy disk, etc. The memory devices 602 and 612 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 612 includes a computer code 614 which is a computer program that includes computer-executable instructions. The computer code 614 includes software or program instructions that may implement an algorithm for implementing methods of the present invention. The processor 608 executes the computer code 614. The memory device 602 includes input data within the input device 604. The input data includes input required by the computer code 614. The output device 610 displays output from the computer code 614. Either or both memory devices 602 and 612 (or one or more additional memory devices not shown) may be used as a computer usable storage medium (or program storage device) having a computer readable program embodied therein and/or having other data stored therein, wherein the computer readable program includes the computer code 614. Generally, a computer program product (or, alternatively, an article of manufacture) of the computer system/device 600 may include the computer usable storage medium (or said program storage device). The processor 608 may represent one or more processors. The memory device 602 and/or the memory device 612 may represent one or more computer readable hardware storage devices and/or one or more memories.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of protecting data, said method comprising:
(A) receiving at a user computing device of a user, a wireless communication received from a sender computing device, said wireless communication comprising a first fragment of a message, said first fragment having a recognizable part and at least one unrecognizable part containing confidential data of interest to the user;
(B) converting, by the user computing device, the at least one unrecognizable part of the first fragment into recognizable data upon receipt of the wireless communication;
(C) presenting, by the user computing device to the user, the first fragment of the message including the recognizable data;
(D) receiving, by the user computing device, a first request from the user for a second fragment of the message, said second fragment having a recognizable part and at least one unrecognizable part containing confidential data of interest to the user;
(E) after said receiving the first request from the user, sending, by the user computing device to the sender computing device, a second request for the second fragment of the message, wherein the second fragment is needed by the user to decipher the message, followed by repeating steps (A) through (C) with respect to the second fragment instead of the first fragment,
wherein the user computing device and the sender computing device communicate wirelessly, and the message comprises at least two fragments that include the first fragment and the second fragment,
wherein said converting requires a password for converting the at least one unrecognizable part into the recognizable data, and wherein the password is included in the second fragment received in the repeated step (A) with respect to the second fragment.

2. The method of claim 1, wherein at least one fragment of the message comprises data represented as a diagram, text, letters, numbers or symbols.

3. The method of claim 1, said method further comprising converting, by the user computing device, the first fragment of the message into an audio signal.

4. The method of claim 1, wherein different fragments of the message are protected by different passwords available to different users.

5. The method of claim 1, wherein said presenting the first fragment comprises displaying the first fragment onto a display.

6. The method of claim 1, wherein said presenting the first fragment comprises printing out the first fragment on a printer.

7. The method of claim 1, wherein said presenting the first fragment comprises outputting the first fragment to a file.

8. A computer program product, comprising one or more computer readable hardware storage devices having computer readable program code stored therein, said program code containing instructions executable by one or more processors of a computer system to implement a method of protecting data, said method comprising:
- (A) receiving at a user computing device of a user, a wireless communication received from a sender computing device, said wireless communication comprising a first fragment of a message, said first fragment having a recognizable part and at least one unrecognizable part containing confidential data of interest to the user;
- (B) converting, by the user computing device, the at least one unrecognizable part of the first fragment into recognizable data upon receipt of the wireless communication;
- (C) presenting, by the user computing device to the user, the first fragment of the message including the recognizable data;
- (D) receiving, by the user computing device, a first request from the user for a second fragment of the message, said second fragment having a recognizable part and at least one unrecognizable part containing confidential data of interest to the user;
- (E) after said receiving the first request from the user, sending, by the user computing device to the sender computing device, a second request for the second fragment of the message, wherein the second fragment is needed by the user to decipher the message, followed by repeating steps (A) through (C) with respect to the second fragment instead of the first fragment,
  wherein the user computing device and the sender computing device communicate wirelessly, and the message comprises at least two fragments that include the first fragment and the second fragment,
  wherein said converting requires a password for converting the at least one unrecognizable part into the recognizable data, and
  wherein the password is included in the second fragment received in the repeated step (A) with respect to the second fragment.

9. The computer program product of claim 8, wherein at least one fragment of the message comprises data represented as a diagram, text, letters, numbers or symbols.

10. The computer program product of claim 8, said method further comprising converting, by the user computing device, the first fragment of the message into an audio signal.

11. A computer system, comprising one or more processors, one or more memories, and one or more computer readable hardware storage devices, said one or more hardware storage device containing program code executable by the one or more processors via the one or more memories to implement a method of protecting data, said method comprising:
- (A) receiving at a user computing device of a user, a wireless communication received from a sender computing device, said wireless communication comprising a first fragment of a message, said first fragment having a recognizable part and at least one unrecognizable part containing confidential data of interest to the user;
- (B) converting, by the user computing device, the at least one unrecognizable part of the first fragment into recognizable data upon receipt of the wireless communication;
- (C) presenting, by the user computing device to the user, the first fragment of the message including the recognizable data;
- (D) receiving, by the user computing device, a first request from the user for a second fragment of the message, said second fragment having a recognizable part and at least one unrecognizable part containing confidential data of interest to the user;
- (E) after said receiving the first request from the user, sending, by the user computing device to the sender computing device, a second request for the second fragment of the message, wherein the second fragment is needed by the user to decipher the message, followed by repeating steps (A) through (C) with respect to the second fragment instead of the first fragment,
  wherein the user computing device and the sender computing device communicate wirelessly, and the message comprises at least two fragments that include the first fragment and the second fragment,
  wherein said converting requires a password for converting the at least one unrecognizable part into the recognizable data, and
  wherein the password is included in the second fragment received in the repeated step (A) with respect to the second fragment.

12. The computer system of claim 11, wherein at least one fragment of the message comprises data represented as a diagram, text, letters, numbers or symbols.

13. The computer system of claim 11, said method further comprising converting, by the user computing device, the first fragment of the message into an audio signal.

14. The computer system of claim 11, wherein different fragments of the message are protected by different passwords available to different users.

* * * * *